United States Patent [19]

Wright

[11] Patent Number: 4,979,310
[45] Date of Patent: Dec. 25, 1990

[54] COMPOSITE LEVEL INCLUDING AN INDEXING SYSTEM FOR ALIGNING THE FRAME WITH THE COVER PLATES

[76] Inventor: Randall J. Wright, 2000 Moraine End, Delafield, Wis. 53018

[21] Appl. No.: 164,245

[22] Filed: Mar. 4, 1988

[51] Int. Cl.⁵ .............................................. G01C 9/24
[52] U.S. Cl. ....................................... 33/379; 33/381; 33/382
[58] Field of Search ................ 33/379, 380, 381, 369, 33/382, 370, 371, 372, 373, 347, 348.2

[56] References Cited

U.S. PATENT DOCUMENTS

| | | | |
|---|---|---|---|
| 2,535,791 | 12/1950 | Fluke | 33/347 |
| 2,789,363 | 4/1957 | Miley | 33/347 |
| 3,213,545 | 10/1965 | Wright | 33/347 |
| 4,124,940 | 11/1978 | Vaida | 33/379 |
| 4,419,833 | 12/1983 | Wright | 33/379 |
| 4,463,501 | 8/1984 | Wright et al. | 33/379 X |
| 4,574,491 | 3/1986 | Vining | 33/379 |
| 4,593,475 | 6/1986 | Mayes | 33/347 |
| 4,607,437 | 8/1986 | McSorley, Sr. et al. | 33/381 |

FOREIGN PATENT DOCUMENTS 1147981 4/1969 United Kingdom .................. 33/381

*Primary Examiner*—Thomas B. Will
*Assistant Examiner*—Christopher W. Fulton
*Attorney, Agent, or Firm*—Jones, Day, Reavis & Pogue

[57] ABSTRACT

The composite level consists of an I-shape aluminum frame having ribbed or working surfaces and a pair of one-piece plastic cover plates integrally formed with end plates secured to the frame. A plurality of measuring vials are supported by the frame and retained by the cover plates. The alignment between the plastic cover plates and the metal frame is provided by an indexing system that minimizes the deleterious effect of the shrinkage of the plastic material of the cover plates during the curing process on the fit between the cover plate and frame. The use of the plastic cover plates and the ribbed working surfaces of the aluminum frame eliminate the necessity of painting and milling the level.

7 Claims, 2 Drawing Sheets

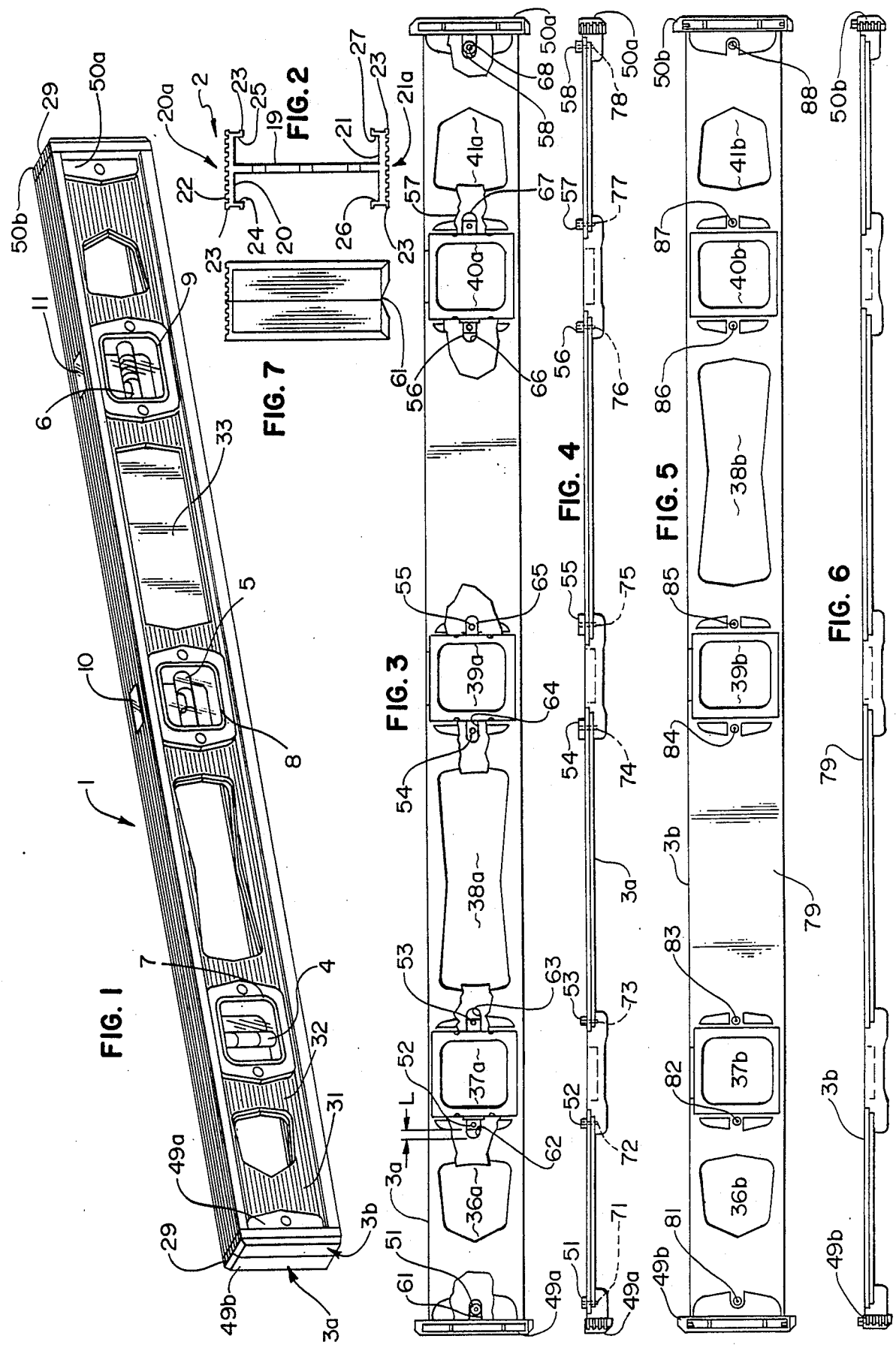

COMPOSITE LEVEL INCLUDING AN INDEXING SYSTEM FOR ALIGNING THE FRAME WITH THE COVER PLATES

BACKGROUND OF THE INVENTION

This invention relates to a composite plastic and metal level measuring instrument which is inexpensive to manufacture yet is aesthetically pleasing and is durable enough to withstand the harsh environment of the work place.

In an effort to control level production costs, manufacturers have developed composite levels comprised of metal frames and plastic body portions. Wright U.S. Pat. No. 4,419,833 represents a level having one type of composite construction. Wright U.S. Pat. No. 4,463,501 discloses an indexing arrangement for securing plastic end plates to a metal frame.

In order to make these levels visually appealing, they are painted during the manufacturing process. The painting process requires the pretreatment of the level with a trichloroethylene solvent. The chemical pretreatment and the painting process are time consuming, expensive, and require careful controls. As a result, there is a need in the industry for a composite plastic and metal level which does not require painting.

In addition to the effect of painting on the appearance of the level, the milling process of the extruded metal frame also enhances the appearance of the level. After being extruded the metal frames are milled to ensure that the exposed or working surfaces of the level are smooth planes. Not only does the milling process provide planar working surfaces, it also leaves score lines on the exposed surface of the frame which enhance the level's appearance and minimize the visual effects of scratching. However, the milling process is expensive and time consuming to perform such that its successful elimination would result in substantial cost savings.

Another known composite level design is the Mayes SuperCede TM level which is constructed of a metal I-shape frame and a pair of single piece plastic cover plates that are arranged on opposite sides of the frame and are secured to one another by screws. As will be understood by one of ordinary skill in the art, the plastic material of the cover plates will shrink as it cures. Because the amount of shrinkage cannot be precisely predicted for the individual cover plates, there is a problem of accurately locating and securing the cover plates to the metal frame. The problem from the shrinkage of the plastic material would be especially acute in long levels where the length of a single piece cover plate would translate into greater amounts of shrinkage. While the Mayes level includes one piece plastic cover plates, it is a small 9 inch level where the shrinkage problem is negligible. The prior art does not disclose an indexing system for longer levels which can accurately position the cover plates on the frame regardless of the shrinkage of the plastic material.

SUMMARY AND OBJECTS OF THE INVENTION

In response to the above-noted shortcomings of the prior art, the present invention has been developed. The invention consists of a composite metal and plastic level including an I-shape extruded metal frame and a pair of one piece plastic cover plates secured to opposite sides of the frame. A plurality of measuring vials are supported by the frame and retained by the cover plates.

An indexing arrangement that minimizes the effect of the shrinkage of the plastic material on the alignment between the cover plates and the frame is provided. A plurality of pegs formed on one of the plastic cover plates mate with corresponding recesses formed in the metal frame. The pegs and recesses are arranged in such a manner that the shrinkage of the plastic material can be accommodated while allowing the cover plate to be securely and accurately mounted to the metal frame. Because the plastic can be molded in different colors, the pretreatment and painting processes can be eliminated.

The exposed or working faces of the metal frame are formed with a plurality of ribs that extend the length of the level thereby eliminating the milling operation. Moreover, the ribs provide better traction between the working surfaces of the level and the surface of the work piece and a better "feel" for the workman than is provided by the known composite levels.

In a modification of the invention one face of the frame member is provided with a V-shape groove that extends the length of the level. This groove facilitates the alignment of the level with corners or rounded objects such as pipes by preventing the level from sliding off of these non-planar work surfaces.

A general object of the invention is to provide an improved composite aluminum and plastic level requiring no painting or milling.

Another object of the invention is to provide a composite level in which the indexing means can accurately align a one piece plastic cover plate to the frame regardless of the length of the level.

A further object of this invention is to provide a composite level where the exposed faces are formed with elongated ribs that eliminate the milling process and improve the traction and "feel" of the tool.

Other objects of the invention, in addition to those set forth above, will become apparent to one of ordinary skill in the art from the following description.

BRIEF DESCRIPTION OF THE DRAWINGS

FIG. 1 shows a perspective view of the composite level of this invention;

FIG. 2 shows a side view of the aluminum frame;

FIG. 3 shows a front view of the unexposed face of the plastic cover plate with a broken-away portion of the metal frame overlaying the cover plate;

FIG. 4 shows an edge view of the cover plate shown in FIG. 3;

FIGS. 5 and 6 show views similar to those of FIGS. 3 and 4, respectively, of the opposite cover plate;

FIG. 7 shows an end view of the level modified with the longitudinally extending V-groove.

DETAILED DESCRIPTION OF THE INVENTION

Figure 8:
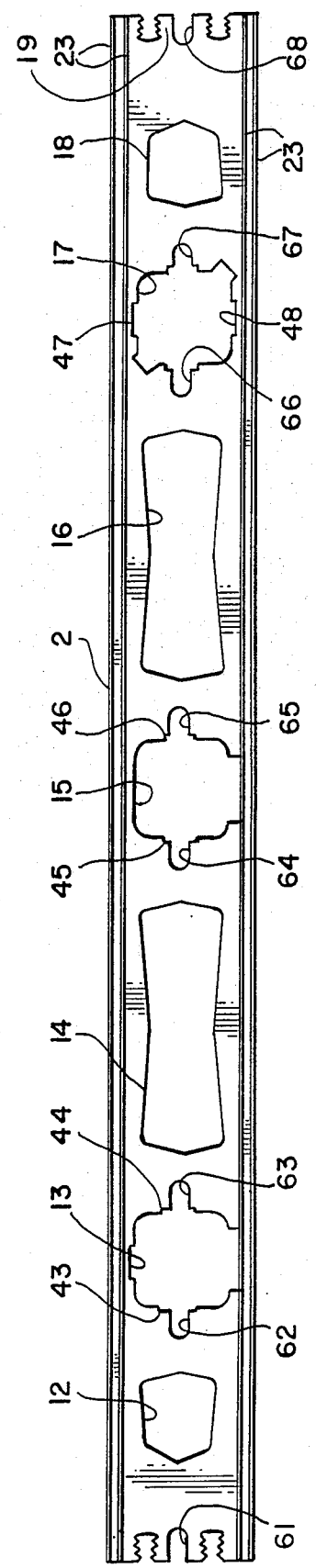
FIG. 8 shows a front view of the metal frame.

FIG. 1 shows the composite level 1 of the invention consisting of an aluminum frame 2 (FIGS. 2 and 8) and a pair of plastic cover plates 3a and 3b (FIGS. 3–6). Located at positions spaced along the length of the level are measuring vials 4, 5 and 6 that can be viewed from either side of the level through windows 7, 8 and 9 or from above through windows 10 and 11.

The description of the aluminum frame 2 will be made with particular reference to FIGS. 2 and 8. The frame 2 consists of an extruded aluminum structure having an I-shape profile. Blanked areas 12-18 are formed in the central web 19 of the frame and form portions of the vial viewing windows and hand holds as will hereinafter be explained.

Formed on the exposed or working faces 20a and 21a of the flanges 20 and 21 are a plurality of ribs 22 that extend the length of the level to define a portion of the working surfaces thereof. Ribs 23 defining auxiliary working surfaces are also formed on lips 24-27 that extend from flanges 20 and 21. The ribs 22 and 23 eliminate the need for a milling operation and enhance and protect the appearance of the level by minimizing the visual effects of dents and scratches. The ribs 22 and 23 also enhance the workman's grip on the tool, especially in cold and wet conditions, and allow the level to better accommodate dirt particles and/or fluid present on the work surface by establishing a better footing for the tool.

The cover plate 3'a will now be described with particular reference to FIGS. 1, 3 and 4. FIG. 1 shows the exposed surface 31 of the cover plate 3b, including the integrally formed end plates 49 and 50 and a plurality of longitudinally extending ribs 32. The ribs 32 substantially cover the surface of the cover plate 3a except for the area 33 that is designed to receive manufacturer's information, logos, etc. The ribs 29 formed on the end plates 49 and 50 are coextensive with the ribs 22 of the flanges 20 and 21 and form the remaining portion of the working surface as shown in FIG. 1.

Because of the length of the cover plates 3a and 3b and the fact that they are formed with integral end plates 49a, 50a and 49b, 50b, respectively, it is critical that the indexing system used to secure the cover plates to the frame 2 be able to accommodate the shrinkage of the plastic material while still providing a secure fit between the cover plates 3a and 3b and the frame 2. The indexing system consists of a plurality of pegs 51-58 arranged along the longitudinal center of the cover plate 3a. The pegs mateably cooperate with recesses 61-68, respectively, formed in the metal frame (FIG. 8) to securely fit the cover plate to the frame, as will hereinafter be described.

As illustrated in FIG. 3, all of the pegs 51-58 form a close fit with the recesses 61-68 in the lateral direction (the lateral direction being defined as the direction extending perpendicular to the working surfaces 20a and 21a) such that the cover plate is restrained from moving relative to the frame in the lateral direction by the engagement of each respective peg and recess. However, only the two center pegs 54 and 55 closely fit their respective recesses in the longitudinal direction (the longitudinal direction being defined as the direction parallel to the working surfaces 20a and 21a). The remaining peg and recess engagements have a small clearance between the peg and the notch in the longitudinal direction as shown in FIG. 3 at L. This clearance accommodates variations in the shrinkage of the plastic cover along its length. The center pegs 54 and 55, because of their close fit with their respective notches 64 and 65 in the longitudinal direction, maintain the position of the cover plate 3a in the longitudinal direction. The shrinkage of the plastic does not affect the engagement of pegs 54 and 55 and notches 64 and 65, respectively, because there is very little plastic material between pegs 54 and 55 to shrink such that the exact positions of pegs 54 and 55 will be known regardless of the shrinkage that occurs over the rest of the cover plate.

Thus, the cover plate 3a is constrained in the longitudinal direction by the engagement of peg 54 and notch 64 and peg 55 and notch 65 and is constrained in the lateral direction by the engagement of all of the respective pegs and notches.

FIG. 8 shows blanked areas 13, 15 and 17 including notched areas 43-48, corresponding in size and shape to the outer periphery of the measuring vials, which retain the vials. The cover plates 3a and 3b include recesses which extend into blanked areas 13, 15 and 17 and cooperate with one another to form cavities that retain the surrounding vials. It should be noted that each pair of cavities can be offset from one another such that the vials 4, 5 and 6 assume different orientations relative to the working surfaces 20a and 21a.

To assemble the level, cover plate 3a is arranged on one side of the central web 19 such that its indexing pegs mate with the respective indexing recesses formed in the frame. The opposite cover plate 3b is not formed with the indexing pegs such that its unexposed surface 79 is basically planar as shown in FIGS. 5 and 6. Thus, when the cover plate 3b is placed on the opposite side of central web 19 from cover plate 3a it is free to slide slightly over the frame 2 to allow screw holes 71-78 of cover plate 3a to be aligned with screw holes 81-88 on cover plate 3b. Once the holes are aligned, screws are inserted such that the cover plates are secured to one another with the central web 19 trapped therebetween. Apertures 37a, 39a, and 40a of cover plate 3a and apertures 37b, 39b, and 40b of cover plate 3b having clear plastic panes molded therein will overlay blanked areas 13, 15, and 17 to form the viewing windows 7, 8 and 9 for the vials. The remaining apertures 36a, 38a, and 41a of cover plate 3a and apertures 36b, 38b, and 41b of cover plate 3b overlay the blanked areas 12, 14, and 18 to form hand holds and convenient means to hang the tool when not in use. It should be noted that blanked area 16 does not have a corresponding aperture in the cover plate 3. However, it is desirable to design the frame 2 with this blanked area in order to make the frame symmetrical and thereby eliminate the possibility of the misalignment of the cover plates relative to the frame during the assembly process.

A modification of the level is shown in FIG. 7 where the flange 21 and the end portions of the cover plate have a v-shape notch 61 formed therein that extends the length of the tool. The notch 61 enables the level to make accurate measurements off of corners and rounded surfaces such as pipes, by preventing the level from slipping off these non-planar surfaces.

Although the invention has been described in its preferred form with a certain degree of particularity, it is to be understood that the present disclosure has been made by way of example only. Numerous changes in the details and construction of the combination and arrangement of parts will be apparent without departing from the spirit and scope of the invention, as defined in the appended claims.

What is claimed is:

1. A composite level comprising:
   a metal frame having a substantially I-shape profile comprising a central web and a pair of flanges integrally formed on opposite edges of said central web and arranged perpendicularly thereto, said flanges formed with a plurality of ribs that extend the length of said metal frame and define portions of the working surfaces of the level; and a pair of one-piece plastic cover plates having integrally formed end portions disposed on opposite sides of said central web and secured to one another, said cover plates having a plurality of ribs that cover a portion of the exposed surface of the cover plate and a further plurality of ribs formed on said end portions coextensive with said ribs formed on said flanges that define the remaining portions of said working surfaces.

2. A composite level according to claim 1, further comprising a plurality of lips integrally formed on the edges of said flanges and arranged perpendicularly thereto, said lips having a plurality of ribs formed thereon that extend the length of the level to define auxiliary working surfaces.

3. A composite level according to claim 1, wherein said one of said flanges has a v-shape groove formed therein that extends the length of the level.

4. A composite level comprising:
a frame;
first and second cover plates secured to the frame;
an indexing means for aligning the first cover plate with the frame comprising a first means for preventing movement of the cover plate relative to the frame in both the lateral and longitudinal directions and a second means for preventing movement of the cover plate relative to the frame in the lateral direction only, said first means including a pair of recesses formed in said frame and said first means further including a pair of pegs formed in said first cover plate and engageable with said recesses; and
means for securing the second cover plate to the first cover plate such that the second cover plate is also indexed to the frame.

5. A composite level comprising:
a frame;
first and second cover plates secured to the frame;
an indexing means for aligning the first cover plate with the frame comprising a first means for preventing movement of the cover plate relative to the frame in both the lateral and longitudinal directions and a second means for preventing movement of the cover plate relative to the frame in the lateral direction only, said second means including at least one recess formed in said frame and said second means further including at least one peg formed in said first cover plate and engageable with said at least one recess; and
means for securing the second cover plate to the first cover plate such that the second cover plate is also indexed to the frame.

6. A composite level comprising:
a frame;
first and second plastic cover plates secured to said frame;
an indexing means for aligning the first cover plate with said frame comprising first and second receiving means formed in said frame and first and second engagement means formed on the cover plate and engageable with the first and second receiving means, respectively, for preventing movement of the first cover plate relative to said frame in the lateral and longitudinal direction, said first and second receiving means comprising recesses formed in said frame, and said first and second engagement means comprising pegs formed on said first cover plate and dimensioned so as to contact said recesses in both the lateral and longitudinal directions;
at least one additional receiving means engageable with at least one additional engaging means for preventing movement of the cover plate relative to the frame in the lateral direction only; and
means for securing the second cover plate to said first cover plate such that said second cover plate is indexed to said frame.

7. A composite level comprising:
a frame;
first and second plastic cover plates secured to said frame;
an indexing means for aligning the first cover plate with said frame comprising first and second receiving means formed in said frame and first and second engagement means formed on the cover plate and engageable with the first and second receiving means, respectively, for preventing movement of the first cover plate relative to said frame in the lateral and longitudinal direction and at least one additional receiving means engageable with at least one additional engaging means for preventing movement of the cover plate relative to the frame in the lateral direction only, said at least one additional receiving means comprising a recess formed in the frame, and said at least one additional engaging means comprising a peg formed on the first cover plate and dimensioned and located so as to contact said recess only in the lateral direction;
means for securing the second cover plate to said first cover plate such that said second cover plate is indexed to said frame.

* * * * *